United States Patent

Harper et al.

[11] Patent Number: 5,614,567
[45] Date of Patent: Mar. 25, 1997

[54] METHOD FOR PREPARING SELF RELEASING SILICONE FOAMS AND METHOD OF REDUCING CYCLE TIME OF PRODUCING SILICONE FOAMS

[75] Inventors: Jack R. Harper; Brian P. Loiselle; William R. Nicholson, all of Midland; Lawrence J. Rapson, Bay City, all of Mich.

[73] Assignee: Dow Corning Corporation, Midland, Mich.

[21] Appl. No.: 589,748

[22] Filed: Jan. 22, 1996

[51] Int. Cl.$^6$ ................................................. C08J 9/14
[52] U.S. Cl. ..................... 521/154; 427/244; 427/373; 427/387; 427/444; 521/88; 521/117
[58] Field of Search ............................ 521/154; 427/244, 427/373, 387, 444

[56] References Cited

U.S. PATENT DOCUMENTS

| 4,490,488 | 12/1984 | Cush | 521/154 |
| 4,590,222 | 5/1986 | Bauman | 521/88 |
| 4,871,781 | 10/1989 | Weise | 521/88 |
| 5,358,975 | 10/1994 | Anderson | 521/77 |

FOREIGN PATENT DOCUMENTS

| 0661337 | 12/1994 | European Pat. Off. | C08J 9/14 |

Primary Examiner—Morton Foelak
Attorney, Agent, or Firm—Robert L. McKellar

[57] ABSTRACT

A method of preparing a self-releasing silicone foam in which a composition containing a siloxane polymer, an organohydrogensiloxane, a platinum catalyst, a polyol, and preferably a monofunctional alcohol is foamed, cured, and then post cured at an elevated temperature. A method of reducing the cycle time of preparing a cured silicone foam in which the above composition is applied to a plastic substrate, foamed, cured, post cured at an elevated temperature and then separated from the plastic substrate.

29 Claims, No Drawings

METHOD FOR PREPARING SELF RELEASING SILICONE FOAMS AND METHOD OF REDUCING CYCLE TIME OF PRODUCING SILICONE FOAMS

BACKGROUND OF THE INVENTION

1. Field of the Invention

This invention relates to methods of reducing the cycle time of producing silicone foams by decreasing the time it takes to post cure the foams. More particularly, this invention relates to methods of reducing the cycle time by using a polyol in the silicone foam composition, increasing the post cure temperature and reducing the post cure time. This invention also relates to methods of producing self- releasing silicone foams.

2. Description of the Related Art

In U.S. Pat. No. 4, 590,222, issued May 20, 1986, Bauman teaches a silicone foam composition containing a polydiorganosiloxane, a resinous copolymer, a platinum catalyst, an organohydrogensiloxane, a hydroxyl-endblocked polydiorganosiloxane, a filler and an organic alcohol.

In European Patent Application No. 661,337 A1, published on Jul. 5, 1995, Takanashi teaches a foamable composition comprising a phenol-containing polyorganosiloxane, a polyorganohydrogen-siloxane, a platinum catalyst, and a monohydric or polyhydric alcohol.

In U.S. Pat. No. 4,871,781, issued on Oct. 3, 1989, Weise teaches a foamable composition comprising a polyorganosiloxane, a polyorganohydrogensiloxane, a platinum catalyst, and a saturated polyhydric alcohol.

In U.S. Pat. No. 5,358,975, issued on Oct. 25, 1994, Anderson teaches a foamable composition comprising a polyorganosiloxane, an organohydrogensiloxane, a platinum catalyst, an α,w-diol, and a resinous copolymer.

The present inventors discovered that the cycle time of producing a cured silicone foam can be reduced by curing a foam composition containing a polyol on a plastic substrate and post curing the cured foam at an elevated temperature. When the post cure temperature is elevated, the post cure time can be reduced. Foamable compositions that were post cured at elevated temperature and did not contain a polyol, adhered to the plastic substrate.

SUMMARY OF THE INVENTION

The present invention provides a method of producing a self releasing silicone foam comprising the steps of mixing a foam forming composition comprising a liquid polyorganosiloxane containing an average of at least two alkenyl radicals per molecule, an organohydrogensiloxane containing at least three silicon-bonded hydrogen atoms per molecule, a polyol, and a platinum catalyst; applying the composition to a plastic substrate; foaming and curing the composition; and post curing the cured foam for a sufficient time and at a sufficient temperature to reduce the compression set of the cured foam.

The present invention also provides a method of reducing the cycle time of producing cured silicone foams by mixing a composition comprising a liquid polyorganosiloxane containing an average of at least two alkenyl radicals per molecule, an organohydrogensiloxane, a polyol, and a platinum catalyst; applying the composition to a plastic substrate; foaming and curing the compositions; and post curing the foam at a temperature of at least 100° C., for a time less than or equal to 12 hours.

DETAILED DESCRIPTION OF THE INVENTION

The present invention provides a method of producing a self releasing silicone foam comprising the steps of:

I) mixing a foam forming composition comprising:
   A) a liquid polyorganosiloxane containing an average of at least two alkenyl radicals per molecule;
   B) an organohydrogensiloxane containing at least three silicon-bonded hydrogen atoms per molecule wherein there is no more than one of said hydrogen atoms per silicon atom;
   C) a polyol; and
   D) a platinum catalyst;
II) applying the composition to a plastic substrate;
III) allowing the composition to form a foam;
IV) curing the foam; and
V) post-curing the cured foam for a sufficient time and at a sufficient temperature to reduce the compression set of the cured foam.

THE POLYORGANOSILOXANE (Ingredient A)

Ingredient A is a liquid polyorganosiloxane. Suitable polyorganosiloxanes contain at least two alkenyl radicals per molecule and exhibit a viscosity of from 0.1 to 100 Pa.s at 25° C. Preferred alkenyl radicals include vinyl, allyl and hexenyl. Vinyl radicals are most prefixfred. At least 90 percent of the repeating units in this polyorganosiloxane are diorganosiloxane units represented by the general formula $R^1R^2SiO$ where $R^1$ and $R^2$ are individually selected from monovalent unsubstituted and substituted hydrocarbon radicals that typically contain from 1 to 10 carbon atoms. The alkenyl radicals that characterize the curable polyorganosiloxane are preferably located at the terminal of the molecule, however one or more can be bonded to non-terminal siloxane units.

In preferred polyorganosiloxanes at least one of the hydrocarbon radicals bonded to each silicon atom is a methyl radical and any remaining hydrocarbon radicals are phenyl, 3,3,3-trifluoropropyl, alkyl or alkenyl. In more preferred polyorganosiloxanes at least 80% of the total number of silicon-bonded hydrocarbon radicals are methyl and the remaining hydrocarbon radicals are alkyl or alkenyl. The polyorganosiloxane may comprise two or more organosiloxane polymers having for example different viscosities, organic substituents or alkenyl content.

THE ORGANOHYDROGENSILOXANE (Ingredient B)

Ingredient B is an organohydrogensiloxane and functions as a curing agent in the foam forming composition of the present invention. The silicon-bonded hydrogen atoms in the organohydrogensiloxane react with the alkenyl radicals of the polyorganosiloxane of ingredient A to cure the foam forming composition of the present invention. Depending upon the amount and hydrogen content of the ingredient B used, the silicon-bonded hydrogen atoms in the organohydrogensiloxane may also be used to generate hydrogen gas for foaming the composition of the present invention. Organohydrogensiloxanes that may be used as ingredient B contain an average of at least three silicon-bonded hydrogen atoms per molecule. The remaining valencies on the silicon atoms are satisfied with organic groups selected from alkyl having 1 to 6 carbon atoms and phenyl groups. Preferred alkyl groups include methyl, ethyl and hexyl. Most preferred are methyl groups.

The organohydrogensiloxane of ingredient B can have a linear or branched structure, and can be a homopolymer, a copolymer, mixtures of two or more different homopolymer, mixtures of two or more different copolymer or mixtures of these types of polymers. Polymers that are suitable for use as ingredient B include but are not limited to polymethylhydrogensiloxane, trimethylsiloxy-terminated polymethylhydrogensiloxane, copolymers of dimethylsiloxane, methylhydrogensiloxane and trimethylsiloxane units and copolymers of dimethylsiloxane, methylhydrogensiloxane and dimethylhydrogensiloxane units. Preferred organohydrogensiloxanes have a linear structure, exhibit a viscosity of from 0.01 to 10 Pa.s at 25° C. and comprise dialkylsiloxane and alkylhydrogensiloxane units with trialkylsiloxy terminal units, where the alkyl radicals contain from 1 to 4 carbon atoms and are most preferably methyl.

The portion of ingredient B used should be sufficient to provide the desired degree of crosslinking during cure and to produce the required amount of hydrogen gas for foaming the mixture. Generally, the proportion of ingredient B will be within the range of from about 5 to about 40 pans by weight per 100 pans by weight of ingredient A. The relative concentrations of organohydrogensiloxane (ingredient B) and polyorganosiloxane (ingredient A) in the foam forming composition of the present invention is equivalent to a molar ratio of silicon-bonded hydrogen atoms to alkenyl radicals that is typically from 3.5:1 to 7.5:1.

THE POLYOL (Ingredient C)

Ingredient C is a polyol. It is an organic alcohol having from 3 to 12 carbon atoms and containing an average of at least two hydroxyl groups per molecule. The carbon chain which makes up the backbone of the polyol may be straight chained or branched or may have an aromatic ring to which a hydroxyl group is not directly bonded. The preferred polyol is a diol. Preferred diols are 1,4-butanediol, 1,5-pentanediol and 1,7-heptanediol. Sufficient polyol should be used to obtain the necessary amount of hydrogen for the foaming process and/or the desired degree of release in the post cured foams. Generally 0.1 to 10 parts by weight of ingredient C should be used per 100 parts of the combined weight of ingredients A and B. The preferred amount of ingredient C is 0.2 to 5 parts by weight per 100 parts of the combined weight of ingredients A and B.

THE CATALYST (Ingredient D)

Ingredient C is a platinum catalyst. The platinum catalysts that may be used as ingredient C in the foam forming composition of the present invention are any of the known forms that are effective in promoting the reaction of SiH groups with silicon-bonded alkenyl groups. Such catalysts are also efficient in promoting the reaction between SiH groups and ≡COH groups in organic alcohols to provide hydrogen for the foaming process. Suitable forms of platinum include but are not limited to chloroplatinic acid, platinum compounds and complexes of platinum compounds with unsaturated organic compounds or with siloxanes having silicon-bonded groups containing ethylenically unsaturated groups. Additional examples of suitable platinum catalysts include complexes of platinum halides or chloroplatinic acid with divinyldisiloxane and complexes formed by the reaction of chloroplatinic acid, divinyltetramethyldisiloxane and tetramethyldisiloxane. Suitable platinum catalysts are described in U.S. Pat. No. 3,419,593, which issued on Dec. 31, 1968, which is incorporated herein by reference for what it teaches about the preparation of such catalysts.

The amount of platinum catalyst is generally the amount that provides from 5 to 250 parts by weight of platinum metal per million parts of the combined weights of ingredients A and B.

THE MONOFUNCTIONAL ALCOHOL
(Ingredient E)

Ingredient E is a monofunctional alcohol. It is a organic alcohol containing 1 to 12 carbon atoms and one hydroxyl group per molecule. The carbon chain which makes up the backbone of the organic alcohol may be straight chained or branched or may have an aromatic ring to which a hydroxyl group is not directly bonded. Ingredient E differs from the polyol of ingredient C in that the monofunctional alcohol can not contain an average of more than one hydroxyl group per molecule. Ingredient E is an optional ingredient that reduces the density of foams prepared from foam forming compositions containing ingredients A, B, C and D. The amount of ingredient E that is needed to reduce the density of the foam of the present invention varies depending upon the composition of the foam forming composition and the monofunctional alcohol used. Examples of monofunctional alcohols include methanol, ethanol, n-propanol, isopropanol, n-butanol, 2butanol, tert-butanol, n-octanol, and benzyl alcohol. The amount of ingredient E that is necessary is generally from about 0.1 to 10 parts of ingredient E per 100 parts of the combined weight of ingredients A and B. The preferred monofunctional alcohol is benzyl alcohol.

OTHER OPTIONAL INGREDIENTS

In addition to the ingredients identified as A, B, C, D, and E, the foam forming composition of the present invention can contain various ingredients to modify the properties of the curable composition and/or the cured foam.

These optional ingredients include but are not limited to finely divided reinforcing and non-reinforcing mineral fillers such as quartz and calcium carbonate; metal oxides such as alumina, hydrated alumina ferric oxide and titanium dioxide; pigments such as carbon black and zinc oxide; organic pigments and dyes; anti-oxidants, heat stabilizers, thixotropic agents, foam stabilizers, ultraviolet stabilizers, flame retarding agents and catalyst inhibitors such as cyclic methylvinylsiloxanes to increase the working time of the foam forming compositions. In preferred embodiments of the present invention, the foam forming composition includes a reinforcing filler.

A preferred optional ingredient in the foam forming composition of the present invention is a resinous organosiloxane copolymer containing triorganosiloxy and $SiO_{4/2}$ units. The triorganosiloxy units in this type of copolymer can be represented by the formula $R^3_3SiO_{1/2}$, where $R^3$ represents a monovalent unsubstituted or substituted hydrocarbon radical. In preferred copolymers, the hydrocarbon radicals represented by $R^3$ are lower alkyl radicals. The most preferred $R^3$ is a methyl radical. The molar ratio of triorganosiloxy units to $SiO_{4/2}$ units in the copolymer is typically from 0.5 to 1.6, inclusive. The copolymer may constitute up to 30 percent of the combined weight of the curable alkenyl-substituted polyorganosiloxane and the copolymer. At least a portion of the silicon atoms in the copolymer contain ethylenically unsaturated hydrocarbon radicals, such as vinyl, as substituents.

The method of this invention is carried out by preparing a foam forming composition by mixing together ingredients A through D and any optional ingredients. As long as the ingredients are mixed to homogeneity, the method of mixing is not critical. Mixing can be done, for example, manually, using static mixing equipment or dynamic mixing equipment. After ingredients A through D and any optional ingredients have been mixed to homogeneity, the foam forming composition is applied to a plastic substrate. The method of application is not critical and can include, for example, pouring, spraying, or dispensing. The application method may be manual or by way of automatic dispensing equipment. The foamable composition is foamed and cured on the plastic substrate. This substrate can be any type of plastic but is preferably a plastic film. The preferred plastic film is a polyester film.

The foam forming composition will begin to foam, at normal ambient temperatures, shortly after mixing has been commenced. If desired, the onset of foaming and curing can be delayed by including an inhibitor in the foam forming composition. Cure of the foamed composition will occur at normal ambient temperatures. However, in preferred embodiments of the present invention, the curing step is completed at elevated temperatures. Temperatures of at least 40° C. are preferred. The cured foam is post cured to improve the physical properties of the final foam. In the present invention, post curing is completed at a temperature of at least 100° C. In preferred embodiments of the present invention, the post curing temperature is at least 120° C. In most preferred embodiments, the post cure temperature is at least 140° C. Foam forming compositions that do not containing a polyol will adhere to the plastic substrate if the foam is post cured at a temperature 100° C. or above. After post cure at temperatures 100° C. or greater, the foam forming compositions of the present invention can be easily separated from the plastic substrate.

The present invention also provides a method of reducing the cycle time of producing cured silicone foams comprising the steps of:

I) mixing a foam forming composition comprising:
  A) a liquid polyorganosiloxane containing an average of at least two alkenyl radicals per molecule;
  B) an organohydrogensiloxane containing at least three silicon-bonded hydrogen atoms per molecule wherein there is no more than one of said hydrogen atoms per silicon atom;
  C) a polyol; and
  D) a platinum catalyst;
II) applying the composition to a plastic substrate;
III) allowing the composition to form a foam;
IV) curing the foam; and
V) post curing the cured foam by heating the cured foam for a sufficient time and at a sufficient temperature to obtain a reduction in the compression set of the cured foam, wherein the post curing time is less than or equal to 12 hours, the post curing temperature is at least 100° C, and the compression set is less than or equal to 5%.

The foam forming composition that is used in the method of reducing the cycle time is as described above, as are the steps of mixing the composition, applying it to the plastic substrate, allowing the composition to foam, and curing the foam. The method of reducing the cycle time of preparing a cured silicone foam, of the present invention, requires that the post curing step be completed at a temperature of at least 100° C. The method also requires that the post curing time is less than or equal to 12 hours and that the compression set of the foam so post cured be no more than 5%.

In preferred embodiments of the present invention, the post cure temperature is at least 120° C. and the post cure time is less than or equal to 6 hours. In more preferred embodiments, the post cure temperature is at least 140° C. and the post cure time is less than or equal to 2 hours.

The foams that are prepared using the method of this invention have low compression sets. Compression set is a measure of the ability of a foam to retain its elastic properties after prolonged exposure to a compressive force. Foams that have lower compression sets better retain their elastic properties. The compression set of a foam varies with the time and temperature at which the foam has been post cured. Foams that are post cured at elevated temperature and/or for long periods of time, generally have lower compression sets.

When the foams are cured or post cured in contact with plastic substrates for long periods of time or at elevated temperatures, the foams tend to adhere to the plastic substrate to such a degree that removing the foam from the plastic substrate is difficult, without damaging the foam, and/or costly. When the foam forming compositions of the present invention are post cured at elevated temperatures, the foams do not adhere to the plastic substrate to such an extent that removing the foam from the plastic substrate, without damaging the foam, is neither difficult nor expensive. In preferred embodiments of the present invention, the plastic substrate is a plastic film. In more preferred embodiments, the plastic film is a polyester film. Thus the cycle time reduction of the present invention is accomplished by increasing the post cure temperature and decreasing the post cure time.

The present invention also provides a method of reducing the cycle time of producing cured silicone foams comprising the steps of:

I) mixing a foam forming composition comprising:
  A) a liquid polyorganosiloxane containing an average of at least two alkenyl radicals per molecule;
  B) an organohydrogensiloxane containing at least three silicon-bonded hydrogen atoms per molecule wherein there is no more than one of said hydrogen atoms per silicon atom;
  C) a polyol; and
  D) a platinum catalyst;
II) applying the composition to a plastic substrate;
III) allowing the composition to form a foam;
IV) curing the foam;
V) post curing the cured foam by heating the cured foam for a sufficient time and at a sufficient temperature to obtain a reduction in the compression set of the cured foam, wherein the post curing time is less than or equal to 12 hours, the post curing temperature is at least 100° C., and the compression set is less than or equal to 10%; and
VI) separating the post cured foam from the plastic substrate.

The foam forming composition that is used in this method of reducing the cycle time is as described above, as are the steps of mixing the composition, applying it to the plastic substrate, allowing the composition to foam, curing the foam, and post curing the foam at elevated temperatures. Foam forming composition of this method have a compression set that is less than or equal to 10%. The method of this invention includes a step wherein the post cured foam is removed from the plastic substrate. The preferred plastic substrate is a plastic film. The preferred plastic film is a polyester film. When the method of this invention is followed, the post cured foam can be easily separated from the plastic substrate. This separation can be done manually or by automatic equipment. The method of this invention is characterized by the fact that the foam will not adhere to the plastic substrate such that it can not be easily removed from the plastic substrate without damaging the foam. In preferred embodiments of the present invention, the foam, when tested according to the 180° Peel Test described below, will exhibit 100% adhesive failure.

The following examples described preferred embodiments of the foam forming composition of the present invention and should not be interpreted as limiting the scope of the invention defined in the accompanying claims. All parts and percentages in the examples are by weight and viscosities were measured at 25° C.

EXAMPLES

The silicone foams of Examples 1–5 and the Comparative Example were prepared according to the following method. Part A of each of the Examples was prepared by mixing the ingredients of Part A in a "HOBART" Mixer for 5 minutes at low speed. "HOBART" is a registered trademark of Hobart Corporation of Troy, OH. Part B of each of the Examples was prepared by combining all of the ingredients of Part B in a 16 oz. container. The container was then shaken on a paint shaker for a 360 second cycle. 10 parts of Part A and 1 part of Part B was placed into a mixing cup and stirred for 60 seconds using a flat tipped wooden tongue depressor to form a foam forming composition. The composition was poured on to a sheet of polyester film having two 0.040 inch shims running the length of the film. The sheet of polyester film was 16 inches wide by 20 inches long by 0.003 inches thick. A second sheet of polyester film, having the same dimensions as the first sheet, was placed on top of the composition to form a composite. The composition was spread by pulling or pushing a 3 inch diameter stainless steel tube across the length of the second sheet of film. The edges of the composite were clipped with large binder clips, with the shims in place. The foam forming composition began to form a foam as soon as the mixing of Part A with Part B was commenced. The foam was cured by placing the composite into a convection oven, that had been pre-heated to 54° C., for 4 minutes. The cured foamed was post cured under the conditions specified in Table I.

The self-releasing properties of the foams of the Comparative Example and Examples 1 to 5, where determined according to ASTM D 903, (except as noted below), which is known as a 180° Peel Test. These results are reported on Table I. The samples for this test where prepared by cutting 1 inch wide by 3 inch long samples from the composite described above, prior to post cure. The cut samples were then post cured at a temperature of 150° C. for 1 hours. The separation rate was 2 inches per minute. Foams with good self-releasing properties exhibit adhesive failure or more preferably, 100% adhesive failure, during the Peel Test. Adhesive failure is defined as foam releasing cleanly, at least partially, from the polyester film. 100% adhesive failure is defined as foam releasing cleanly from the polyester film with no tearing of the foam. Cohesive failure is defined as the foam adhering to the polyester film and tearing during the Peel Test.

The tear strengths of the Comparative Example and Examples 1 to 5, were determined according to ASTM D 624, (except as noted below), and are reported on Table I. The samples for this test were pulled at a rate of 20 inches per minute. The tear strengths of the foams were determined after the foams were post cured for 10 minutes at 190° C. Results are reported as pounds force per inch (ppi).

The densities of the foams prepared in the comparative Example and Examples 1 to 5 were determined according to ASTM D 3574, and reported on Table I. Density is reported as pounds per cubic foot (pcf). The densities of the foams were determined after the foams were post cured for 10 minutes at 190° C. The 50% compression sets of the foams of the Comparative Example and of Examples 1 to 5 were determined according to ASTM D 395, Method B (except as noted below), and reported on Table II. Foam samples used for this test were cured for 4 minutes at 54° C. The foams were then post cured according to the conditions specified in Table II. The method of the present invention results in a cycle time reduction that is accomplished by reducing the post cure time and increasing the post cure temperature, for example, from 12 hours at 100° C. to 1 hour at 150° C.

Comparative Example

Part A 73 parts by weight of dimethylvinylsiloxy-terminated polydimethylsiloxane with 27% by weight of silica, having a viscosity of approximately 48,000 cps 22.7 parts by weight of five micron silica 4 parts by weight of benzyl alcohol 0.3 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Part B 71.3 parts by weight of a mixture containing equal parts by weight of (1) a trimethylsiloxy-terminated organohydrogensiloxane containing 1.6 percent silicon-bonded hydrogen and (2) an organosiloxane copolymer consisting essentially of $(CH_3)_3SIO_{1/2}$ and $SiO_2$ units with a molar ratio of $(CH_3)_3SiO_{1/2}:SiO_2$ units of about 0.75. The resin can be prepared as described in U.S. Pat. No. 4,332,518, and contains about 1.7 weight percent of hydroxyl groups 24 parts by weight of a trimethylsiloxy-terminated polydiorganosiloxane containing an average of five methylhydrogensiloxane units and three dimethylsiloxane units per molecule with a silicon-bonded hydrogen atom content of 0.8 weight percent 4.7 parts by weight of dimethylvinylsiloxy-terminated polydimethylsiloxane with 27% by weight of silica, having a viscosity of approximately 48,000 cps

Example 1

Part A 73 parts by weight of dimethylvinylsiloxy-terminated polydimethylsiloxane with 27% by weight of silica, having a viscosity of approximately 48,000 cps 2.33 parts by weight of dimethylvinylsiloxy-terminated polydimethylsiloxane, having a viscosity of approximately 45,000 cps 22.7 parts by weight of five micron silica 1.67 parts by weight of 1,4-butanediol 0.3 parts per weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Part B 71.3 parts by weight of a mixture containing equal parts by weight of ( 1 ) a trimethylsiloxy-terminated organohydrogensiloxane containing 1.6 percent silicon-bonded hydrogen and (2) an organosiloxane copolymer consisting essentially of (CH3)3SiO1/2 and SiO2 units with a molar ratio of $(CH_3)_3SiO_2:SiO_2$ units of about 0.75. The resin can be prepared as described in U.S. Pat. No. 4,332,518, and contains about 1.7 weight percent of hydroxyl groups 4 parts by weight of a trimethylsiloxy-terminated polydiorganosiloxane containing an average of five methylhydrogensiloxane units and three dimethylsiloxane units per molecule with a silicon-bonded hydrogen atom content of 0.8 weight percent 4.7 parts by weight of dimethylvinylsiloxy-terminated polydimethylsiloxane with 27% by weight of silica, having a viscosity of approximately 48,000 cps Example 2

Part A 73 parts by weight of dimethylvinylsiloxy-terminated polydimethylsiloxane with 27% by weight of silica, having a viscosity of approximately 48,000 cps 0.23 parts by weight of dimethylvinylsiloxy-terminated polydimethylsiloxane, having a viscosity of approximately 45,000 cps 22.7 parts by weight of five micron silica 3.6 parts by weight of benzyl alcohol 0.17 parts by weight of 1,4-butanediol 0.3 parts by weight of the reaction product of hexachloroplatinic acid and sym tetramethyldivinyldisiloxane that has been diluted with a liquid dimethylvinylsiloxy-terminated polydimethylsiloxane in an amount sufficient to achieve a platinum content of 0.6 weight percent Part B 71.3 parts by weight of a mixture containing equal parts by weight of ( 1 ) a trimethylsiloxy-terminated organohydrogensiloxane containing 1.6 percent silicon-bonded hydrogen and (2) an organosiloxane copolymer consisting essentially of (CH3)3SiO$_{1/2}$ and SiO$_2$ units with a molar ratio of $(CH_3)_3SiO_2:SiO_2$ units of about 0.75. The resin can be prepared as described in U.S. Pat. No. 4,332,518, and contains about 1.7 weight percent of hydroxyl groups 24 parts by weight of a trimethylsiloxy-terminated polydiorganosiloxane containing an average of five methylhydrogensiloxane units and three dimethylsiloxane units per molecule with a silicon-bonded hydrogen atom content of 0.8 weight percent 4.7 parts by weight of dimethylvinylsiloxy-terminated polydimethylsiloxane with 27% by weight of silica, having a viscosity of approximately 48,000 cps Example 3

Part A 75.05 parts by weight of dimethylvinylsiloxy-terminated polydimethylsiloxane, having a viscosity of approximately 10,500 cps 22.7 parts by weight of five micron silica 95 parts by weight of 1,4-butanediol 0.3 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Part B 29 parts by weight of trimethylsiloxy-terminated polymethylhydrogensiloxane with an average degree of polymerization of about 40.

19 parts by weight of a trimethylsiloxy-terminated polydiorganosiloxane containing an average of five methylhydrogensiloxane units and three dimethylsiloxane units per molecule with a silicon-bonded hydrogen atom content of 0.8 weight percent 52 parts by weight of dimethylvinylsiloxy-terminated polydimethylsiloxane, having a viscosity of approximately 10,500 cps Example 4

Part A 73 parts by weight of dimethylvinylsiloxy-terminated polydimethylsiloxane with 27% by weight of silica, having a viscosity of approximately 48,000 cps 2.07 parts by weight of dimethylvinylsiloxy-terminated polydimethylsiloxane, having a viscosity of approximately 45,000 cps 22.7 parts by weight of five micron silica 1.93 parts by weight of 1,5-pentanediol 0.3 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Part B 71.3 parts by weight of a mixture containing equal parts by weight of ( 1 ) a trimethylsiloxy-terminated organohydrogensiloxane containing 1.6 percent silicon-bonded hydrogen and (2) an organosiloxane copolymer consisting essentially of $(CH_3)_3SiO_{1/2}$ and $SiO_2$ units with a molar ratio of $(CH_3)_3SiO_{1/2}:SiO_2$ units of about 0.75. The resin can be prepared as described in U.S. Pat. No. 4,332,518, and contains about 1.7 weight percent of hydroxyl groups 24 parts by weight of a trimethylsiloxy-terminated polydiorganosiloxane containing an average of five methylhydrogensiloxane units and three dimethylsiloxane units per molecule with a silicon-bonded hydrogen atom content of 0. 8 weight percent 4.7 parts by weight of dimethylvinylsiloxy-terminated polydimethylsiloxane with 27% by weight of silica, having a viscosity of approximately 48,000 cps

Example 5

Part A 73 parts by weight of dimethylvinylsiloxy-terminated polydimethylsiloxane with 27% by weight of silica, having a viscosity of approximately 48,000 cps 1.53 parts by weight of dimethylvinylsiloxy-terminated dimethylsiloxane, having a viscosity of approximately 45,000 cps 22.7 parts by weight of five micron silica 2.47 parts by weight of 1,7-heptanediol 0.3 parts by weight of the reaction product of hexachloroplatinic acid and sym tetramethyldivinyldisiloxane that has been diluted with a liquid dimethylvinylsiloxy-terminated polydimethylsiloxane in an amount sufficient to achieve a platinum content of 0.6 weight percent Part B 71.3 parts by weight of a mixture containing equal parts by weight of (1) a trimethylsiloxy-terminated organohydrogensiloxane containing 1.6 percent silicon-bonded hydrogen and (2) an organosiloxane copolymer consisting essentially of $(CH_3)_3SiO_{1/2}$ and $SiO_2$ units with a molar ratio of $(CH_3)_3SiO_{1/2}$:$SiO_2$ units of about 0.75. The resin can be prepared as described in U.S. Pat. No. 4,332,518, and contains about 1.7 weight percent of hydroxyl groups 24 parts by weight of a trimethylsiloxy,terminated polydiorganosiloxane containing an average of five methylhydrogensiloxane units and three dimethylsiloxane units per molecule with a silicon-bonded hydrogen atom content of 0.8 weight percent 4.7 parts by weight of dimethylvinylsiloxy-terminated polydimethylsiloxane with 27% by weight of silica, having a viscosity of approximately 48,000 cps

TABLE I

| Example | Density (pcf) | Tear Strength Die C (ppi) | Post Cure Condition | Adhesion (Peel Strength) (lb/in) | Adhesion Failure Mode |
|---|---|---|---|---|---|
| Comparative Example | 12.1 | 5.0 | 1 hour at 150 C. | 1.37 | Cohesive |
| Example 1 | 15.1 | 7.7 | 1 hour at 150 C. | 0.25 | Adhesive |
| Example 2 | 12.2 | 5.9 | 1 hour at 150 C. | 0.97 | Adh/Coh |
| Example 3 | 20.9 | 2.2 | 1 hour at 150 C. | *0.00 | Adhesive |
| Example 4 | 18.7 | 10.5 | 1 hour at 150 C. | 0.29 | Adhesive |
| Example 5 | 17.5 | 8.7 | 1 hour at 150 C. | 0.17 | Adhesive |

*The release properties of the foam of Example 3 were such that the foam did not adhere to the polyester film long enough to be tested according to the test method of ASTM D 903.

TABLE II

| Example | Post Cure Condition | Adhesion (Peel Strength) (lb/in) | Adhesion Failure Mode | 50% Compression Set 22 hours at 100 C. |
|---|---|---|---|---|
| Comparative Example | 12 hours at 100 C. | 1.05 | Cohesive | 2.5% |
| Comparative Example | 1 hour at 150 C. | 1.37 | Cohesive | 6.6% |
| Example 1 | 1 hour at 150 C. | 0.25 | Adhesive | 1.8% |
| Example 2 | 12 hours at 100 C. | 0.36 | Adhesive | |
| Example 2 | 1 hour at 150 C. | 0.97 | Adh/Coh | 2.8% |
| Example 3 | 1 hour at 150 C. | *0.00 | Adhesive | 2.4% |

*The release properties of the foam of Example 3 were such that the foam did not adhere to the polyester film long enough to be tested according to the test method of ASTM D 903.

That which is claimed:

1. A method of producing a self releasing silicone foam comprising the steps of:
    I) mixing a foam forming composition comprising:
        A) a liquid polyorganosiloxane containing an average of at least two alkenyl radicals per molecule;
        B) an organohydrogensiloxane containing at least three silicon-bonded hydrogen atoms per molecule wherein there is no more than one of said hydrogen atoms per silicon atom;
        C) a polyol; and
        D) a platinum catalyst;
    II) applying the composition to a plastic substrate;
    III) allowing the composition to form a foam;
    IV) curing the foam; and
    V) post curing the cured foam for a sufficient time and at a sufficient temperature to reduce the compression set of the cured foam.

2. The method of claim 1, wherein said foam forming composition further comprises
    E) a monofunctional alcohol.

3. The method of claim 1, wherein the polyol is a diol.

4. The method of claim 3, wherein the polyol is selected from the group consisting of 1,4-butanediol, 1,5-pentanediol, and 1,7-heptanediol.

5. The method of claim 1, wherein the curing step comprises exposing the foam to a temperature greater than 25° C.

6. The method of claim 1, wherein the curing step comprises exposing the foam to a temperature of at least 40° C.

7. The method of claim 1, wherein the plastic substrate is a plastic film.

8. The method of claim 7, wherein the plastic substrate is a polyester film.

9. The method of claim 1, wherein the temperature of the post curing step is at least 100° C.

10. The method of claim 1, wherein the temperature of the post curing step is at least 120° C.

11. The method of claim 1, wherein the temperature of the post curing step is at least 140° C.

12. The method of claim 1, further comprising the step of
    VI) separating the post cured foam from the plastic substrate.

13. The method of claim 1, wherein said foam forming composition further comprises
    F) a resinous copolymer.

14. A method of reducing the cycle time of producing cured silicone foams comprising the steps of:

I) mixing a foam forming composition comprising:
  A) a liquid polyorganosiloxane containing an average of at least two alkenyl radicals per molecule;
  B) an organohydrogensiloxane containing at least three silicon-bonded hydrogen atoms per molecule wherein there is no more than one of said hydrogen atoms per silicon atom;
  C) a polyol; and
  D) a platinum catalyst;
II) applying the composition to a plastic substrate;
III) allowing the composition to form a foam;
IV) curing the foam; and
V) post curing the cured foam by heating the cured foam for a sufficient time and at a sufficient temperature to obtain a reduction in the compression set of the cured foam, wherein the post curing time is less than or equal to 12 hours, the post curing temperature is greater than or equal to 100° C., and the compression set is less than or equal to 5%.

15. The method of claim 14, wherein said foam forming composition further comprises
  E) a monofunctional alcohol.

16. The method of claim 14, wherein the polyol is a diol.

17. The method of claim 16, wherein the polyol is selected from the group consisting of 1,4-butanediol, 1,5-pentanediol, and 1,7-heptanediol.

18. The method of claim 14, wherein the curing step comprises exposing the foam to a temperature of at least 40° C.

19. The method of claim 14, wherein the plastic substrate is a plastic film.

20. The method of claim 19, wherein the plastic substrate is a polyester film.

21. The method of claim 14, wherein said foam forming composition further comprises
  F) a resinous copolymer.

22. A method of reducing the cycle time of producing cured silicone foams comprising the steps of:
  I) mixing a foam forming composition comprising:
    A) a liquid polyorganosiloxane containing an average of at least two alkenyl radicals per molecule;
    B) an organohydrogensiloxane containing at least three silicon-bonded hydrogen atoms per molecule wherein there is no more than one of said hydrogen atoms per silicon atom;
    C) a polyol; and
    D) a platinum catalyst;
  II) applying the composition to a plastic substrate;
  III) allowing the composition to form a foam;
  IV) curing the foam;
  V) post curing the cured foam by heating the cured foam for a sufficient time and at a sufficient temperature to obtain a reduction in the compression set of the cured foam, wherein the post curing time is less than or equal to 12 hours, the post curing temperature is at least 100° C., and the compression set is less than or equal to 10%; and
  VI) separating the post cured foam from the plastic substrate.

23. The method of claim 22, wherein said foam forming composition further comprises
  E) a monofunctional alcohol.

24. The method of claim 22, wherein the polyol is a diol.

25. The method of claim 24, wherein the polyol is selected from the group consisting of 1,4-butanediol, 1,5-pentanediol, and 1,7-heptanediol.

26. The method of claim 22, wherein the curing step comprises exposing the foam to a temperature of at least 40° C.

27. The method of claim 22, wherein the plastic substrate is a plastic film.

28. The method of claim 27, wherein the plastic substrate is a polyester film.

29. The method of claim 28, wherein said foam forming composition further comprises
  F) a resinous copolymer.

* * * * *